3,623,215
METHOD OF MAKING WIRE-WOUND SHAPED CHARGE CONICAL LINER

Clarence E. Weinland, Vista, Calif., assignor to the United States of America as represented by the Secretary of the Navy
No Drawing. Filed June 5, 1970, Ser. No. 59,792
Int. Cl. B23k 31/02
U.S. Cl. 29—477.3                                   2 Claims

ABSTRACT OF THE DISCLOSURE

A method of fabricating a conical metal cavity liner such that its mass in any section transverse to its axis is uniformly distributed. The method includes the steps of anchoring copper or other wire in place on a conical mandrel and winding this basic wire onto the mandrel until a cone is formed, winding a soldering or filler wire into the grooves formed between adjacent turns of the basic wire winding, heating the mandrel with the double winding in place so as to fuse the filler wire and basic wire into an integral unit. After cooling, the cone formed is removed as a unit from the mandrel.

GOVERNMENT INTEREST

The invention described herein may be manufactured and used by or for the government of the United States of America for governmental purposes without the payment of any royalties thereon or therefor.

BACKGROUND OF THE INVENTION

The invention relates to a conical metallic liner for a shaped charge warhead.

Liners for cavity-charge type explosives are well known. However, liners fabricated by winding wire on a conical form and then bonding the turns together is new and described in detail in applicant's co-pending application Ser. No. 59,793 filed June 5, 1970. The method described therein provides for uniform distribution of the basic wire. The present invention provides a method for bonding turns of the basic winding strongly together with highly precise and uniform distribution of the bonding agent.

BRIEF DESCRIPTION OF THE INVENTION

The present invention makes use of the same type conical mandrel and winding device used to make the basic wound conical liner for a shaped charge warhead described in co-pending application Ser. No. 59,793 referenced herein. Briefly, a cone shaped mandrel precoated with a mold-release agent is provided, a wire consisting of round copper or other metal of uniform diameter is anchored to the apex of the mandrel which is positioned in a winding device where the wire is wound onto the mandrel in turns until a cone is formed. Each turn of wire is positioned in contact with the previous turn so that a groove is formed between the turns. A soldering or filling wire is next wound in the grooves and the unit comprising the double winding and mandrel are heated so as to fuse the filler wire with the first wire winding thereby forming an integral cone-shaped unit. After cooling, the cone-shaped unit is removed from the mandrel.

Square wire can also be used. The basic winding should then be made with the edges having large enough radius so that there is an adequate groove between turns to properly locate and hold the filler wire. The brazing or soldering filler wire should be of a composition which melts to a liquid with enough capillarity so that it flows well into the minute crevice between the turns of the basic metal wire, and should be of sufficiently small size that there is no excess material present beyond that which is necessary for bonding the turns, and so will not spread and flow over either the inside or outside surface of the cone to give uneven material distribution. A silver-copper eutectic (72/28 Ag/Cu) round wire was used as a filler wire. This alloy melts sharply in the groove at 1435° F. and can be used on copper without flux. When molten it is very fluid and tends to run out over the surface of the basic copper winding. Other brazing alloys can be used.

What is claimed is:

1. A method of fabricating a conical metal cavity liner having its mass in any section transverse to its axis of uniform distribution which consists essentially of
    (a) providing a cone-shaped mandrel precoated with a mold-release agent;
    (b) anchoring a first wire of uniform diameter to the apex of said mandrel;
    (c) winding said first wire in turns onto said mandrel until a cone is formed, said turns being positioned in contact with each other whereby grooves are formed between said turns;
    (d) securing the end of said wire to the base of said mandrel;
    (e) anchoring a second wire to the apex of said mandrel;
    (f) winding said second wire into said grooves;
    (g) securing said second wire to the base of said mandrel;
    (h) heating the mandrel with the double wire wound cone in place until the second wire fuses with the first wire thereby forming a fused cone;
    (i) cooling the mandrel and fused cone; and
    (j) removing said fused cone from the mandrel.

2. The method in accordance with claim 1 wherein said first wire consists of copper and said second wire consists of silver-copper alloy.

References Cited
UNITED STATES PATENTS

| | | | |
|---|---|---|---|
| 2,749,607 | 6/1956 | McIlvane | 29—480 X |
| 3,149,598 | 9/1964 | Rees et al. | 29—480 X |
| 3,218,975 | 11/1965 | Massey | 102—56 |

JOHN F. CAMPBELL, Primary Examiner

R. B. LAZARUS, Assistant Examiner

U.S. Cl. X.R.

29—475